(12) United States Patent
Kanno

(10) Patent No.: US 7,236,264 B2
(45) Date of Patent: Jun. 26, 2007

(54) SYSTEM AND METHOD FOR ADJUSTING COLOR REPRODUCTION

(75) Inventor: Hiroki Kanno, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 974 days.

(21) Appl. No.: 10/281,267

(22) Filed: Oct. 28, 2002

(65) Prior Publication Data

US 2004/0080763 A1   Apr. 29, 2004

(51) Int. Cl.
*H04N 1/58* (2006.01)
*H04N 1/60* (2006.01)
*G06K 9/00* (2006.01)

(52) U.S. Cl. .................. 358/1.9; 358/522; 358/518; 358/504; 358/3.26; 382/168; 382/169; 382/170; 382/171; 382/172

(58) Field of Classification Search .............. 358/1.9, 358/518–519, 523, 527, 515, 537–538, 522, 358/504, 3.26; 399/39–41, 28, 184; 382/162, 382/168–172, 167
See application file for complete search history.

(56) References Cited

U.S. PATENT DOCUMENTS 5,809,366 A * 9/1998 Yamakawa et al. .......... 399/39
6,122,441 A * 9/2000 Tsuji ......................... 358/1.9

FOREIGN PATENT DOCUMENTS

JP   2000-201275 A   7/2000

* cited by examiner

*Primary Examiner*—Kimberly Williams
*Assistant Examiner*—Charlotte M. Baker
(74) *Attorney, Agent, or Firm*—Foley & Lardner LLP (57) ABSTRACT

A system and method for adjusting the color of a scanned image includes obtaining image data for the scanned image, generating an output image from the scanned image, and obtaining image data for the output image. The differences between the image data of the scanned image and the image data of the output image are determined, coefficients are generated from the determined differences. The image data of the scanned image is then adjusted based on the generated coefficients.

10 Claims, 4 Drawing Sheets

SYSTEM AND METHOD FOR ADJUSTING COLOR REPRODUCTION

FIELD OF THE INVENTION

The present invention relates generally to image processing, and more particularly to a system and method for adjusting color reproduction in an image processing device.

BACKGROUND OF THE INVENTION

Hardcopy devices, such as photocopiers, scanners and printers, are capable of reproducing color images from color documents and photographs. To reproduce the color images, the images from the color documents or photographs are sensed and reproduced based upon tristimulus values, whose amplitude is proportional to radiance, but whose spectral composition is carefully chosen according to the principles of color science. Tristimulus values in typical imaging systems are represented as red, green and blue (RGB), which are linear light values. In the typical imaging systems, the RGB tristimulus values are subjected to a nonlinear transfer function, such as gamma correction, that mimics the lightness response of vision. The resulting non-linear light values may be represented as R'G'B' tristimulus values.

A digitized color image is represented as an array of pixels, where each pixel contains numerical components that define a color. The systems that may be used for image coding include the linear RGB and nonlinear R'G'B' systems described above. Other image coding systems include non-linear cyan, magenta and yellow (CMY), nonlinear CMY and black (CMYK), and derivatives of these coding systems. Cyan in tandem with magenta produces blue, cyan with yellow produces green and yellow with magenta produces red. The CMY values are typically derived from the RGB or R'G'B' values, and the K value is typically derived from the CMY values.

In a color image, there are regions that include black and regions that do not include black. These regions can be referred to as black color regions and non-black color regions. The non-black color regions may correspond to regions of light tones, such as regions incorporating skin color. After an image is scanned, RGB data is generated and can be converted to CMY data. The CMY data is then used to determine the K data or black level for each pixel.

Conventional hardcopy devices capable of producing color images can include color adjusting functions to allow users to change and preferably improve the reproduction of a color image. However, given the difficulty of understanding color theory and the poor functionality of these color adjusting functions, proper color adjustment can be very difficult and often fails to produce acceptable image quality. The difficulties in generating acceptable reproduction of color images using these color adjusting functions is equally applicable to color copiers and color printers.

SUMMARY OF THE INVENTION

Briefly, in one aspect of the invention, a method for adjusting the color of a scanned image includes obtaining image data for the scanned image, generating an output image from the scanned image, and obtaining image data for the output image. The differences between the image data of the scanned image and the image data of the output image are determined, coefficients are generated from the determined differences. The image data of the scanned image is then adjusted based on the generated coefficients.

In another aspect of the present invention, an output image is generated from the adjusted image data of the scanned image.

In yet another aspect of the present invention, the image data of the scanned image and the output image each comprise RGB data, a three-dimensional histogram is generated from the RGB data of the scanned image, and a three-dimensional histogram is generated from the RGB data of the output image.

In a further aspect of the present invention, peak values are identified for each color region of the scanned image from the three-dimensional histogram from the RGB data of the scanned image and peak values are identified for each color region of the scanned image from the three-dimensional histogram from the RGB data of the output image, wherein the determined differences are determined from the identified peak values.

DETAILED DESCRIPTION OF THE PREFERRED EMBODIMENT

Figure 1:
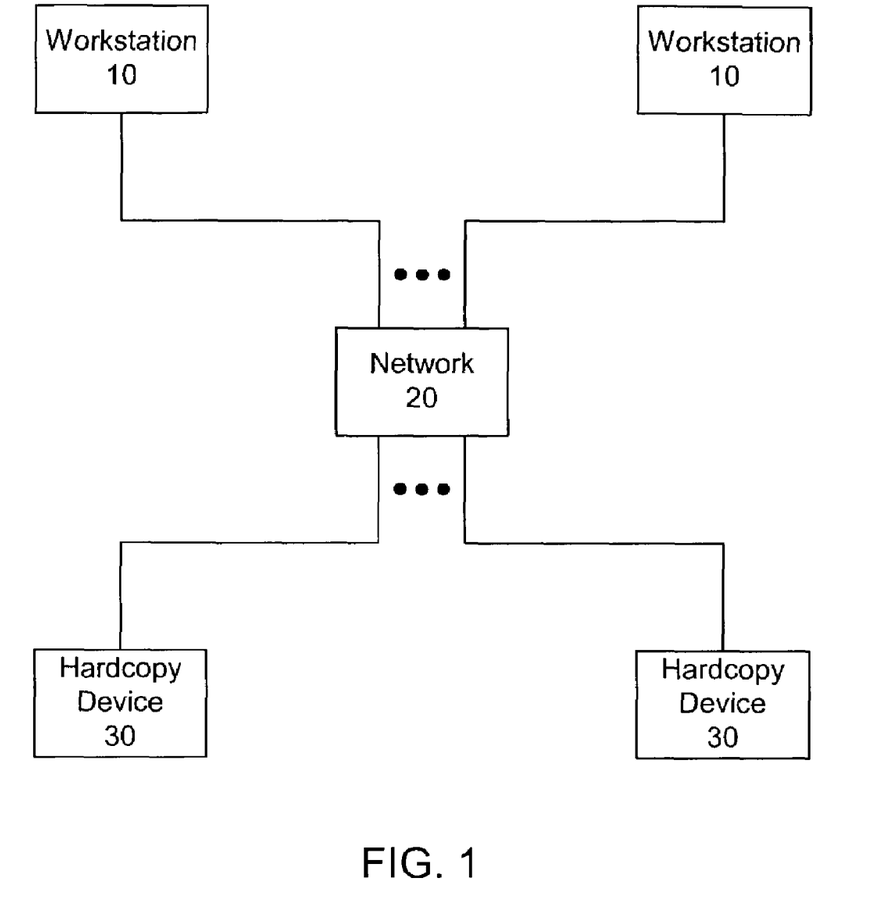
FIG. 1 is a block diagram of a communication system consistent with the present invention.

FIG. 1 is a block diagram of a communication system consistent with the present invention. As shown in FIG. 1, the communication system includes one or more workstations 10, a network 20, and one or more hardcopy devices 30. Each of the workstations and each of the hardcopy devices are coupled to the network 20. The network 20 may be implemented as a local network, such as a LAN, or as a public network, such as the Internet.

The workstation 10, which may be a PC or a server, includes a CPU, a main memory, a ROM, a storage device and a communication interface all coupled together via a bus in one embodiment consistent with the present invention. The CPU may be implemented as a single microprocessor or as multiple processors for a multi-processing system. The main memory is preferably implemented with a RAM and a smaller-sized cache. The ROM is a non-volatile storage, and may be implemented, for example, as an EPROM or NVRAM. The storage device can be a hard disk drive or any other type of non-volatile, writable storage.

The communication interface for the workstation 10 provides a two-way data communication coupling via a network link to the network 20. For example, if the communication interface is an integrated services digital network (ISDN) card or a modem, the communication interface provides a data communication connection to the corresponding type of telephone line. If the communication interface is a local area network (LAN) card, the communication interface provides a data communication connection to a compatible LAN. Wireless links are also possible. In any such implementation, the communication interface sends and receives electrical, electromagnetic or optical signals, which carry digital data streams representing different types of information, to and from the network 20.

If the network is implemented as the Internet, the workstation 10 or server can transmit a requested code for an application program through the Internet, an ISP, the local network and the communication interface. The received code can be executed by the CPU in the workstation or server as it is received, stored in the storage device, or stored in some other non-volatile storage for later execution. In this manner, a user at the workstation or server may obtain application code in the form of a carrier wave.

The hardcopy device 30 is a device that generates hardcopies of images or text, such as a printer, a fax machine, a copier, a plotter, a scanner or any other functional device. One hardcopy device 30 can also perform the functions of two or more of these devices, commonly referred to as a multi-function peripheral (MFP), which is also known as a multi-function printer. Like the workstation 10, the hardcopy device 30 may have a CPU, a main memory, a ROM, a storage device and a communication interface all coupled together via a bus. The hardcopy device 30 may also have a communication interface to provide a two-way data communication coupling via a network link to the network 20. The network link to the network 20 enables the hardcopy device 30 to receive data from and to output data to the workstation 10. Instead of a network link, hardcopy devices 30 may use a Universal Serial Bus (USB) to connect to a USB port on the workstation 10.

In operation, the workstations 10 communicate with the hardcopy devices 30 via the network 20 or via a more direct connection, such as the USB. This communication enables the workstation 10 to request the hardcopy device 30 to perform a function, such as print a document or send or receive a fax. In addition, the workstation 10 can request information from the hardcopy device 30.

To communicate with the hardcopy device 30, the workstation 10 may use a network protocol such as SNMP, which is a protocol for monitoring and managing systems and devices in a network. The functions supported by the protocol are the request and retrieval of data, the setting or writing of data, and traps that signal the occurrence of events. The data being monitored and managed is defined by a management information base (MIB). A MIB includes the specification and formal description of a set of objects and variables that can be read and possibly written using the SNMP protocol. SNMP and similar communication protocols can also be used with non-networked connections, such as USB, FireWire and IEEE 1284 (Parallel).

Figure 2:
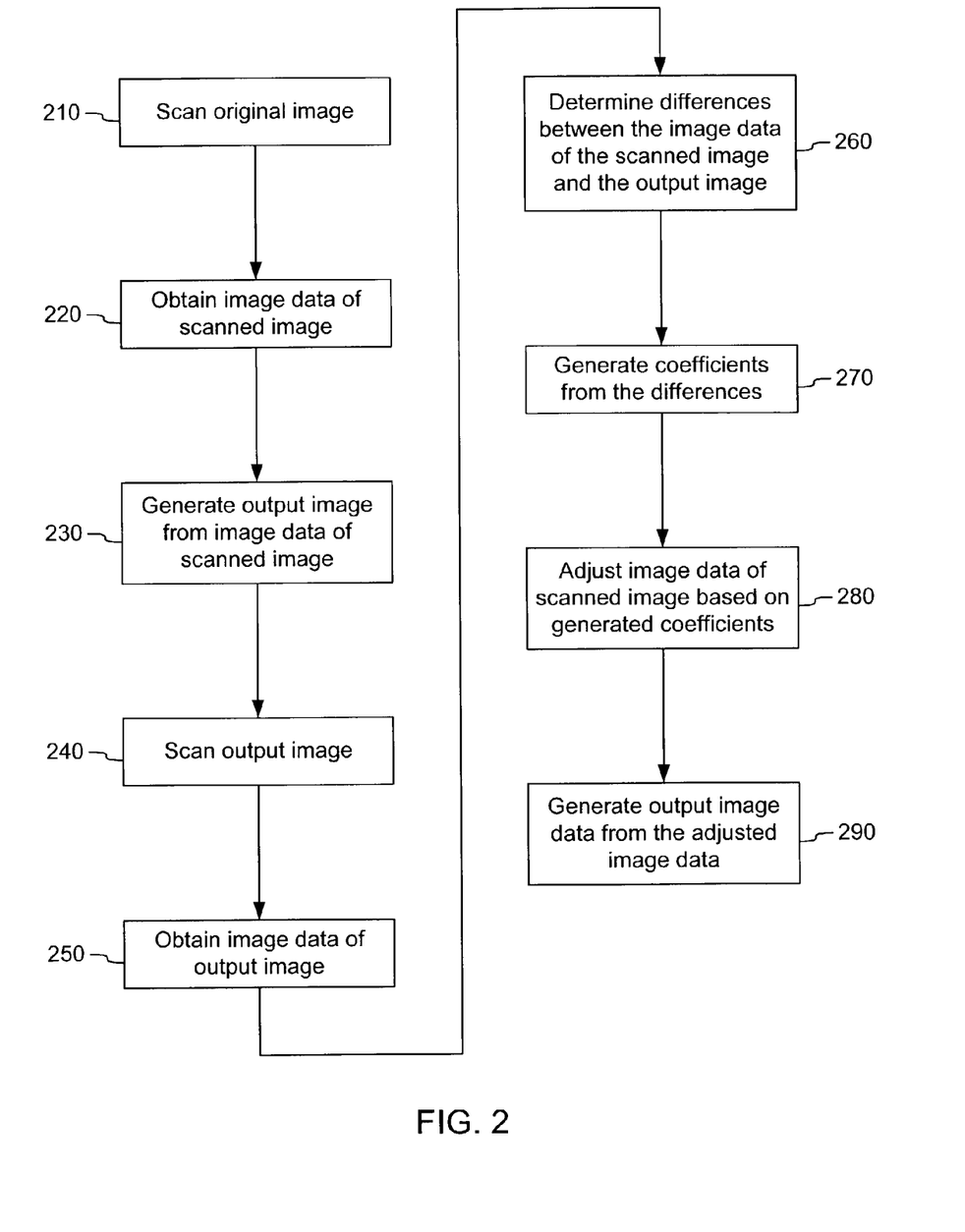
FIG. 2 is a flow diagram of a color adjustment process consistent with the present invention.

FIG. 2 is a flow diagram of a color adjustment process consistent with the present invention. As shown in FIG. 2, an original image is scanned (step 210). The original image is preferably a color image on a document that can include text, pictures, icons or other image items. The original image can be scanned by a hardcopy device 30, such as a copier, a scanner or an MFP having a scanning function. Image data from the scanned original image is then obtained (step 220). The image data can be stored in a storage area internal to the hardcopy device 30 which scanned the original image, such as a memory buffer, page memory or a hard disk. Alternatively, the image data can be stored in a centralized storage area, such as in a file storage server coupled to the hardcopy device 30 by the network 20. The image data itself can be RGB data, where each RGB value of the image data represents a particular pixel of the scanned original image. The RGB data can also be translated into other color coding systems, such as CMY. For the purposes of this description, the color adjustment process consistent with the present invention will be described with respect to the RGB coding system, although one skilled in the art will understand that it is equally applicable to other color coding systems.

Based on the image data of the scanned image, an output image is generated (step 230). The output image can be generated by the hardcopy device 30, such as a printer or copier, on a document. Then, like the original image, the output image is scanned (step 240). The output image can similarly be scanned by a hardcopy device 30, such as a copier, a scanner or an MFP having a scanning function. Image data is then obtained from the scanned output image (step 250). The image data for the output image, which is preferably RGB data, can be stored in a storage area internal to the hardcopy device 30 which scanned the original image, such as a memory buffer or a hard disk. Alternatively, the image data can be stored in a centralized storage area, such as in a file storage server coupled to the hardcopy device 30 by the network 20. The image data itself can be RGB data, where each RGB value of the image data represents a particular pixel of the scanned original image.

Instead of scanning an output image generated from the scanned original image, it is also possible to scan an image having a target color of interest, which can be referred to as a target image. For example, if the original image has multiple colors including green, and the user wants the green in the original image to more closely resemble the green in a target image, the green of the target image is the target color of interest. The green in the target image can then be scanned instead of the output image generated from the scanned original image. For the purposes of the following description, it should be understood that the output image can correspond to the image generated from the scanned original image or to a target image having one or more target colors of interest.

In general, the color content of the original image and the output image reproduced from the original image is not identical. There are several reasons for this lack of identity. One reason, for example, is that an electro-photographing printing process, an inkjet process or other image reproduction process in the hardcopy device 30 is inherently unstable. It can be affected by changes in temperature and in humidity, as well as aging of the hardcopy device 30. In fact, the reproduction of images may change between the time the hardcopy device 30 is turned on and later operation of it. Another problem is that there are imperfections involved in scanning the original image to generate the image data from which the output image is generated, such as from the color detectors inexactly identifying the color from the original image.

Figure 3:
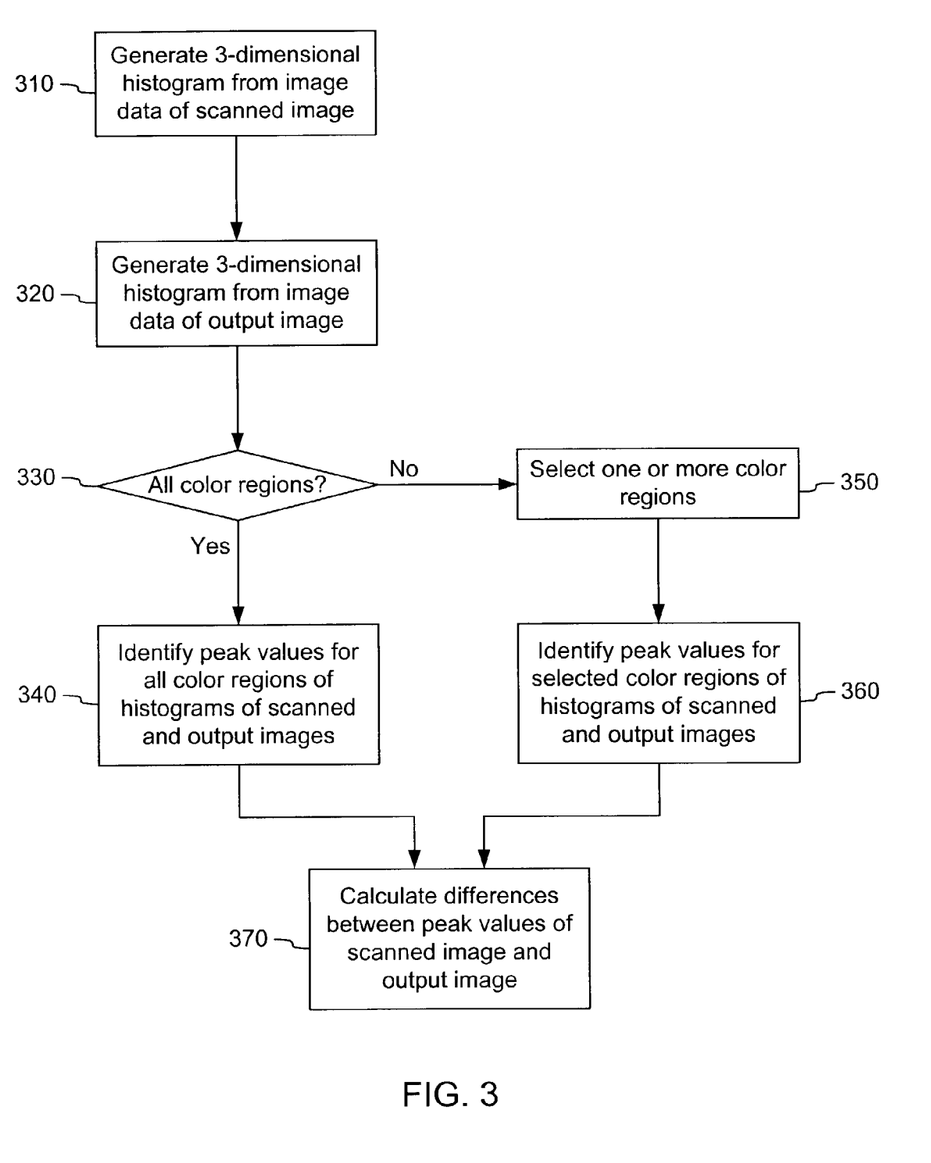
FIG. 3 is a flow diagram for calculating differences between color images for the color adjustment process of FIG. 2.

By knowing the differences between the original image and the output image reproduced from the scanned original image, it is possible to produce an output image that more closely matches the original image or more closely matches one or more target colors of interest. As shown in FIG. 2, after obtaining the image data for the original image and the output image, the differences between the image data for the two images are determined. FIG. 3 is a flow diagram for calculating differences between color images for the color adjustment process of FIG. 2.

As shown in FIG. 3, a three-dimensional (3-D) histogram is generated from the image data of the scanned original image (step 310). The 3-D histogram is a three-dimensional diagram that represents the color density of the scanned original image based on the RGB data. The generation of the 3-D histogram is a standard process understood by one skilled in the art. Table 1 below provide a numerical representation of the color density of an exemplary scanned image.

TABLE 1

| R Data Value | G Data Value | B Data Value | Count |
|---|---|---|---|
| 0–15 | 0–15 | 0–15 | 990 |
| 0–15 | 0–15 | 16–31 | 1000 |
| 0–15 | 0–15 | 32–47 | 995 |
| . | . | . | . |
| . | . | . | . |
| . | . | . | . |
| 0–15 | 0–15 | 240–255 | 0 |
| 0–15 | 16–31 | 0–15 | 0 |
| 0–15 | 16–31 | 16–31 | 0 |
| . | . | . | . |
| . | . | . | . |
| . | . | . | . |
| 16–31 | 0–15 | 0–15 | 0 |
| 16–31 | 0–15 | 16–31 | 0 |
| . | . | . | . |
| . | . | . | . |
| . | . | . | . |
| 240–255 | 240–255 | 224–239 | 800 |
| 240–255 | 240–255 | 240–255 | 550 |

As shown in Table 1, each row of the table shows a range of sixteen data values for each of the RGB data. In addition, each row includes a count for those ranges, where the count represents a color density of the image for those ranges of data values. The count values shown in the table are exemplary only, and do not correspond to a particular image.

A 3-D histogram is also generated from the image data of the scanned output image (step 320). The functionality for generating the 3-D histograms can be implemented in hardware, such as an ASIC, or software or some combination thereof. The functionality can be located in the hardcopy device 30 scanning the images. Alternatively, the functionality can be implemented in a workstation 10 or other computing device coupled to the hardcopy device 30 scanning the images.

Using the 3-D histograms, it is possible to identify peak values for each of the color regions of the image. The color regions of the image include, for example, blue, black, green, gray, skin color, etc. The 3-D histogram can be divided into multiple regions, where each region corresponds to a particular color region. The division can be based on the RGB data values since particular ranges of RGB data values correspond to particular colors. For example, the ranges of RGB data values for the color green correspond approximately to a range of 0–47 for the R data value, 208–255 for the G data value and 0–47 for the B data value (assuming data values between 0 and 255). With reference to Table 1, these ranges would correspond to 27 rows of the table, as shown in Table 2 below.

TABLE 2

| R Data Value | G Data Value | B Data Value | Count |
|---|---|---|---|
| 0–15 | 0–15 | 208–223 | — |
| 0–15 | 0–15 | 224–239 | — |
| 0–15 | 0–15 | 240–255 | — |
| . | . | . | . |
| . | . | . | . |
| . | . | . | . |
| 0–15 | 16–31 | 208–223 | — |
| 0–15 | 16–31 | 224–239 | — |
| 0–15 | 16–31 | 240–255 | — |
| . | . | . | . |
| . | . | . | . |
| . | . | . | . |
| 32–47 | 32–47 | 208–223 | — |
| 32–47 | 32–47 | 224–239 | — |
| 32–47 | 32–47 | 240–255 | — |

For each region, the peak value can be identified by identifying the maximum value in the particular color region. Like the generation of the 3-D histograms, the process for identifying peak values from the color regions is a standard process understood by one skilled in the art. With reference to Table 1, for example, the peak value for a color region can be identified from the highest count value present in the relevant rows of the table. For example, the peak value for the green color region would be identified by the highest count value from among the 27 rows corresponding to the green color region.

It should be understood that the color regions can be broken up into different size blocks or regions. The 3-D histogram can be shown with R, G and B each representing an axis with values between 0 and 255, thereby defining a 255×255×255 cube. This cube can be broken down into any number of sub-cubes, such as 16×16×16 or 32×32×32 sized sub-cubes. Each of these sub-cubes can be considered a color region for which a peak value can be identified. In general, for the purposes of generating the coefficients described below, the number of peak values identified can be less than 1000. For example, if the color regions are each 32×32×32 sub-cubes, there would be 512 peak values identified from the resulting 512 sub-cubes.

Like the generation of the 3-D histograms, the functionality for identifying the peak values can be implemented in hardware, in software or some combination thereof. The functionality can be located in the hardcopy device 30 scanning the images. Alternatively, the functionality can be implemented in a workstation 10 or other computing device coupled to the hardcopy device scanning the images.

Before identifying the peak values from each of the 3-D histograms, it is first determined whether the peak values are to be determined for each of the color regions (step 330). This determination can be made by receiving an indication from the user that each of the colors are to be adjusted. The user can make this indication through a user interface located on the hardcopy device 30 or at the workstation 10. The user interface can prompt the user to indicate whether the color adjustment should be for all colors or only for selected target colors. In the absence of an indication from the user, a default can be set. If the user indicates that all colors are to be adjusted, then the peak values are identified for all of the color regions of each of the histograms (step 340). As described above, the peak value for a particular color region can be determined by locating the maximum value in the particular color region of each histogram. Each peak value corresponds to a particular RGB value. Exemplary peak values for the green region of an original image and an output image can be, for example, 16, 240 and 0 (RGB) for the original image and 16, 224 and 32 for the output image.

If, however, the user indicates that only one or more target colors are to be adjusted, then the one or more target colors are selected (step 350). The same user interface discussed above can be used to prompt the user to identify the selected target colors. The selected target colors can be, for example, green, blue, black, gray, skin color or any other color that may appear in an image. Instead of identifying the target colors by inputs through the user interface, it is possible for the target colors to be identified automatically. If an image having only the target colors is scanned instead of the output image generated from the scanned original image, the target colors can be recognized automatically from the scanned image having only the target colors. The functionality for automatically identifying the target colors can be implemented in hardware and/or software located in the hardcopy device 30 or in a computing device coupled to the hardcopy device 30.

Once the target colors have been selected or identified, the peak values are identified for the selected or identified color regions of each of the histograms (step 360). As discussed above, the peak values for particular color regions can be determined from the 3-D histograms. For example, the peak values can be identified from the highest count values from the relevant row shown in Table 1.

Having identified the peak values for all or selected color regions, the differences can be calculated between the peak values identified from the histogram of the original image and the peak values identified from the histogram of the output image (or image having the target colors) (step 370). For each color, the difference is determined between RGB value of the peak value for the original image and the RGB value of the peak value for the output image. However, calculating the differences between the peak values is not necessary.

Returning to FIG. 2, based on the identified peak values of the original image and the output image, a set of coefficients is generated (step 260). The set of coefficients can be used to adjust the image data corresponding to the original image so that the output image more closely corresponds to the color of the original image or more closely corresponds to one or more target colors. The set of coefficients can be calculated using a least squared method as would be understood by one skilled in the art.

Using the generated coefficients, the image data of the original image is adjusted (step 270). The following equation provides an example of how the image data of the original image can be adjusted using the generated coefficients:

$$\begin{bmatrix} R \\ G \\ B \end{bmatrix} = \begin{bmatrix} a_{11} a_{21} a_{31} \\ a_{12} a_{22} a_{32} \\ a_{13} a_{23} a_{33} \end{bmatrix} \begin{bmatrix} R' \\ G' \\ B' \end{bmatrix}$$

where RGB is the image data to be used to generate the output image, the 'a' values are the calculated adjustment coefficients, and R'G'B' is the image data of the scanned original image. According to the equation, R is calculated by the equation, $R=a_{11}R'+a_{21}G'+a_{31}B'$. The G and B data values are similarly calculated with the corresponding coefficients. These calculations are applied to each R'G'B' value, which corresponds to each pixel of the original image.

The functionality for calculating the differences between the peak values, generating the adjustment coefficients and adjusting the image data values can be implemented in hardware, in software or some combination thereof. The functionality can be located in the hardcopy device 30 scanning the images. Alternatively, the functionality can be implemented in a workstation 10 or other computing device coupled to the hardcopy device scanning the images.

An output image is then generated from the adjusted image data of the original image (step 290). The adjusted image data takes into account the differences in color between the original image and the output image generated from the unadjusted image data of the original image (or the target color of a target image). As a result, the output image generated from the adjusted image data provides improved color reproduction that more closely matches the color of the original image or the target color of a target image.

In the above description of FIGS. 2 and 3, the differences between the colors of the original image and the colors of the output image or target image are calculated and used to generate a set of adjustment coefficients that adjust the image data of the original image. To obtain the colors of the output or target image, those images are scanned like the original image. Instead of scanning the output or target image, it is also possible to store image data for one or more target colors that can be used to adjust the color of the original image. The image data for these target colors can be pre-programmed and stored in a storage area in the hardcopy device 30 providing the color adjustment or in another computing device that can be referenced in the color adjustment process. In addition, any newly scanned output image or target image can be stored in this target color storage area for future use against new original images. To use these target image colors, a user interface can provide the user with a mechanism to search through and identify desired target image colors that the user wishes to use to adjust the color or colors of the original image. To adjust the color of the original image using the identified target image colors, the image data of the original image is compared to the desired target image colors, the differences between them are calculated, the set of coefficients are generated from the differences, and the image data of the original image is adjusted with the generated coefficients.

In the above description of FIGS. 2 and 3, the color adjustment of the original image is effected with the use of a reference image, such as the scanned output image generated from the image data of the original image or the scanned target image having one or more target colors of interest. It is also possible to perform color adjustment of the original image that results in improved color image reproduction even without the use of a reference image.

Figure 4:
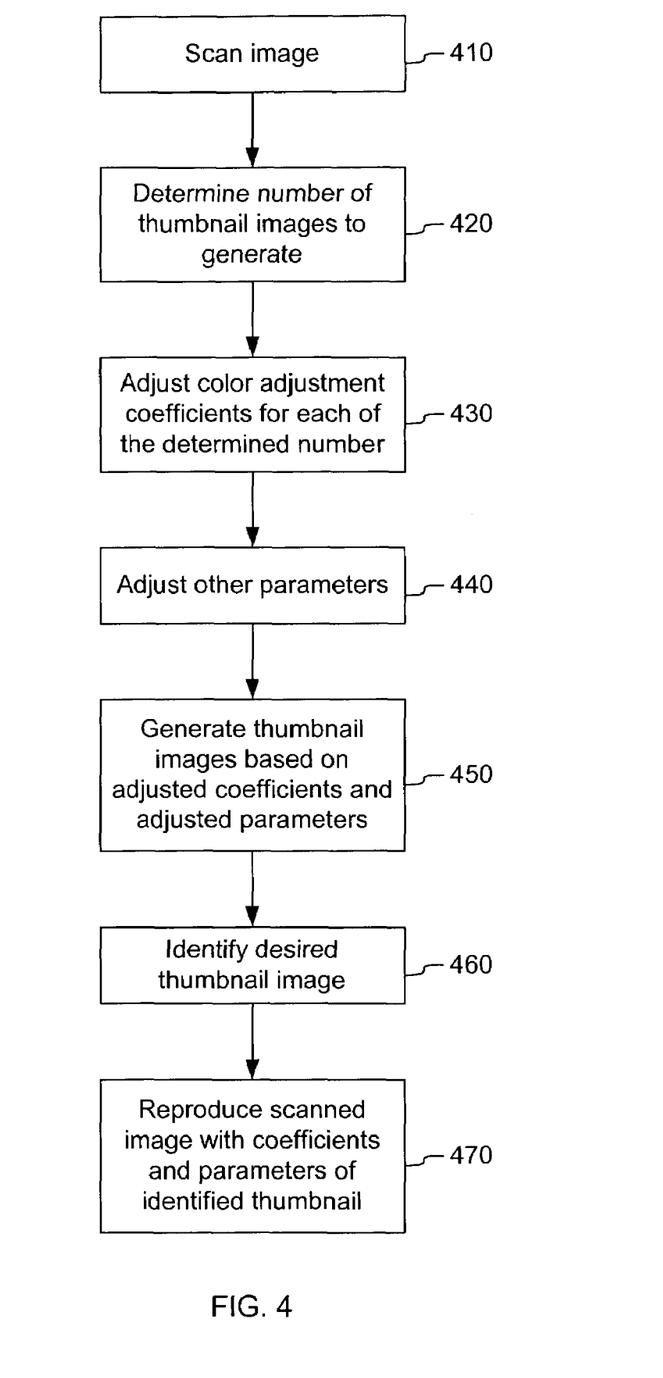
FIG. 4 is a flow diagram of another color adjustment process consistent with the present invention.

FIG. 4 is a flow diagram of another color adjustment process consistent with the present invention without the use of a reference image. As shown in FIG. 4, an original image is scanned (step 410). The original image is preferably a color image on a document that can include text, pictures, icons or other image items. The original image can be scanned by a hardcopy device 30, such as a copier, a scanner or an MFP having a scanning function. Image data from the scanned original image is obtained and can be stored in a storage area internal to the hardcopy device 30 which scanned the original image, such as a memory buffer, page memory or a hard disk. Alternatively, the image data can be stored in a centralized storage area, such as in a file storage server coupled to the hardcopy device 30 by the network 20. The image data itself can be RGB data, where each RGB value of the image data represents a particular pixel of the scanned original image. The RGB data can also be translated into other color coding systems, such as CMY.

After scanning the original image, it is determined how many thumbnail images to generate based on the scanned original image (step 420). The thumbnail image is an output image generated from the image data of the original image. Each of the thumbnail images provides a different color adjustment to the image data of the original image, such that each thumbnail image provides a different color reproduction of the original image. To determine the number of thumbnail images to generate, the user may indicate the desired number through a user interface on the hardcopy device 30 or computing device coupled to the hardcopy device 30. Alternatively, the number can be set as a default.

For each of the thumbnail images, a set of adjustment coefficients is generated (step 430). Each set of adjustment coefficients is preferably different than each of the other sets of adjustment coefficients, although it is also possible that two or more thumbnail images can use the same set of adjustment coefficients. By using different adjustment coefficients, each thumbnail image produces a different color reproduction of the original image. Each set of adjustment coefficients can be generated in a variety of ways. For example, a default set of adjustment coefficients can be used for one thumbnail image, and each other set of adjustment coefficients can be a modified version of the default set. To generate the modified version, one or more of the coefficients of the default set can be changed, such as by a certain percentage or by a certain increment. If there are ten thumbnail images, one thumbnail image could use the default set of adjustment coefficients, and the other nine could use the default set with a respective one of the adjustment coefficients being modified. One skilled in the art will recognize that there are numerous ways in which the sets of coefficients can be generated such that each set of coefficients is different for each of the thumbnail images.

In addition to generating adjustment coefficients, other parameters can be adjusted (step 440). These other parameters include, for example, various gamma curves, different sharpness levels for text and/or pictures. The adjusted parameters may be applied to each of the thumbnail images in the same way or to each of the thumbnail images in a unique way. In addition, the user can specify through the user interface which parameters to adjust, as well as how to adjust the parameters, whether to apply the adjusted parameters to each of the thumbnail images or to apply the adjusted parameters to selects ones of the thumbnail images. For example, it would be possible to have the same set of adjustment coefficients applied to two thumbnail images, but with different adjusted parameters. Similarly, it would be possible to have a different set of adjustment coefficients applied to two thumbnail images, but with the same adjusted parameters.

Based on the adjustment coefficients and the adjusted parameters, each of the thumbnail images is generated (step 450). The thumbnail images can be generated by the hard-copy device 30 on the same document or each on its own document. The generated thumbnail images are then reviewed by the user.

Based on the review, the user identifies the thumbnail image having the most desirable color reproduction (step 460). The user can identify the desired thumbnail image through the user interface. To facilitate the identification, each of the thumbnail images can be numbered, such as 1 to n, where n represents the number of thumbnail images. To identify the desired thumbnail image, the user can simply select the number corresponding to the desired thumbnail image. Once the desired thumbnail image is identified, the scanned original image is reproduced in accordance with the adjustment coefficients and adjusted parameters of the identified thumbnail image (step 470).

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method for adjusting the color of a scanned image, comprising:
   obtaining image data for the scanned image, the image data of the scanned image comprising RGB data;
   generating an output image from the scanned image;
   obtaining image data for the output image, the image data of the output image comprising RGB data;
   generating a three-dimensional histogram from the RGB data of the scanned image:
   generating a three-dimensional histogram from the RGB data of the output image:
   identifying peak values for each color region of the scanned image from the three-dimensional histogram from the RGB data of the scanned image and peak values for each color region of the scanned image from the three-dimensional histogram from the RGB data of the output image:
   generating coefficients from differences between the identified peak values for each color region of the scanned image and the identified peak values for each color region of the output image; and
   adjusting the image data of the scanned image based on the generated coefficients.

2. A method according to claim 1, further comprising generating an output image from the adjusted image data of the scanned image.

3. A computer system configured to adjust the color of a scanned image, comprising:
   a processor; and
   a memory, coupled to the processor, the memory comprising a plurality of instructions executed by the processor, the plurality of instructions configured to:
   obtain image data for the scanned image, the image data of the scanned image comprising RGB data;
   generate an output image from the scanned image;
   obtain image data for the output image, the image data of the output image comprising RGB data;
   generating a three-dimensional histogram from the RGB data of the scanned image;
   generating a three-dimensional histogram from the RGB data of the output image;
   identifying peak values for each color region of the scanned image from the three-dimensional histogram from the RGB data of the scanned image and peak values for each color region of the scanned image from the three-dimensional histogram from the RGB data of the output image;
   generate coefficients from differences between the identified peak values for each color region of the scanned image and the identified peak values for each color region of the output image; and
   adjust the image data of the scanned image based on the generated coefficients.

4. A computer system according to claim 3, the memory further comprising an instruction configured to generate an output image from the adjusted image data of the scanned image.

5. A method for adjusting the color of a scanned image, comprising:
   obtaining image data for the scanned image, the image data of the scanned image comprising RGB data;
   generating an output image from the scanned image;
   obtaining image data for the output image, the image data of the output image comprising RGB data;
   generating a three-dimensional histogram from the RGB data of the scanned image;

generating a three-dimensional histogram from the RGB data of the output image;

identifying peak values for at least one color region of the scanned image from the three-dimensional histogram from the RGB data of the scanned image and peak values for at least one color region of the scanned image from the three-dimensional histogram from the RGB data of the output image;

generating coefficients from differences between the identified peak values for the at least one color region of the scanned image and the identified peak values for the at least one color region of the output image; and adjusting the image data of the scanned image based on the generated coefficients.

6. A method according to claim 5, further comprising identifying color regions in the image data of the scanned image corresponding to the at least one color region, wherein the adjusting includes using the generated coefficients only to adjust the image data of the scanned image in the identified color regions.

7. A method according to claim 5 further comprising receiving an input from a user identifying the at least one color region.

8. A computer system configured to adjust the color of a scanned image, comprising:
   a processor; and
   a memory, coupled to the processor, the memory comprising a plurality of instructions executed by the processor, the plurality of instructions configured to:
      obtain image data for the scanned image, the image data of the scanned image comprising RGB data;
      generate an output image from the scanned image;
      obtain image data for the output image, the image data of the output image comprising RGB data;
      generate a three-dimensional histogram from the RGB data of the scanned image;
      generate a three-dimensional histogram from the RGB data of the output image;
      identify peak values for at least one color region of the scanned image from the three-dimensional histogram from the RGB data of the scanned image and peak values for at least one color region of the scanned image from the three-dimensional histogram from the RGB data of the output image,
      generate coefficients from differences between the identified peak values for the at least one color region of the scanned image and the identified peak values for the at least one color region of the output image; and
      adjust the image data of the scanned image based on the generated coefficients.

9. A computer system according to claim 8, the memory further comprising instructions configured to:
   identify color regions in the image data of the scanned image corresponding to the at least one color region; and
   adjust the image data of the scanned image only in the identified color regions based on the generated coefficients.

10. A computer system according to claim 8, the memory further comprising an instruction configured to receive an input from a user identifying the at least one color region.

* * * * *